3,834,967
APPARATUS FOR FORMING FOAMED PANELS
William E. Lowery, Orinda, and Roger G. Jennings, Oakland, Calif., assignors to Control Building Systems, Inc.
Filed Apr. 30, 1971, Ser. No. 145,255
Int. Cl. B29b 5/04
U.S. Cl. 156—356
16 Claims

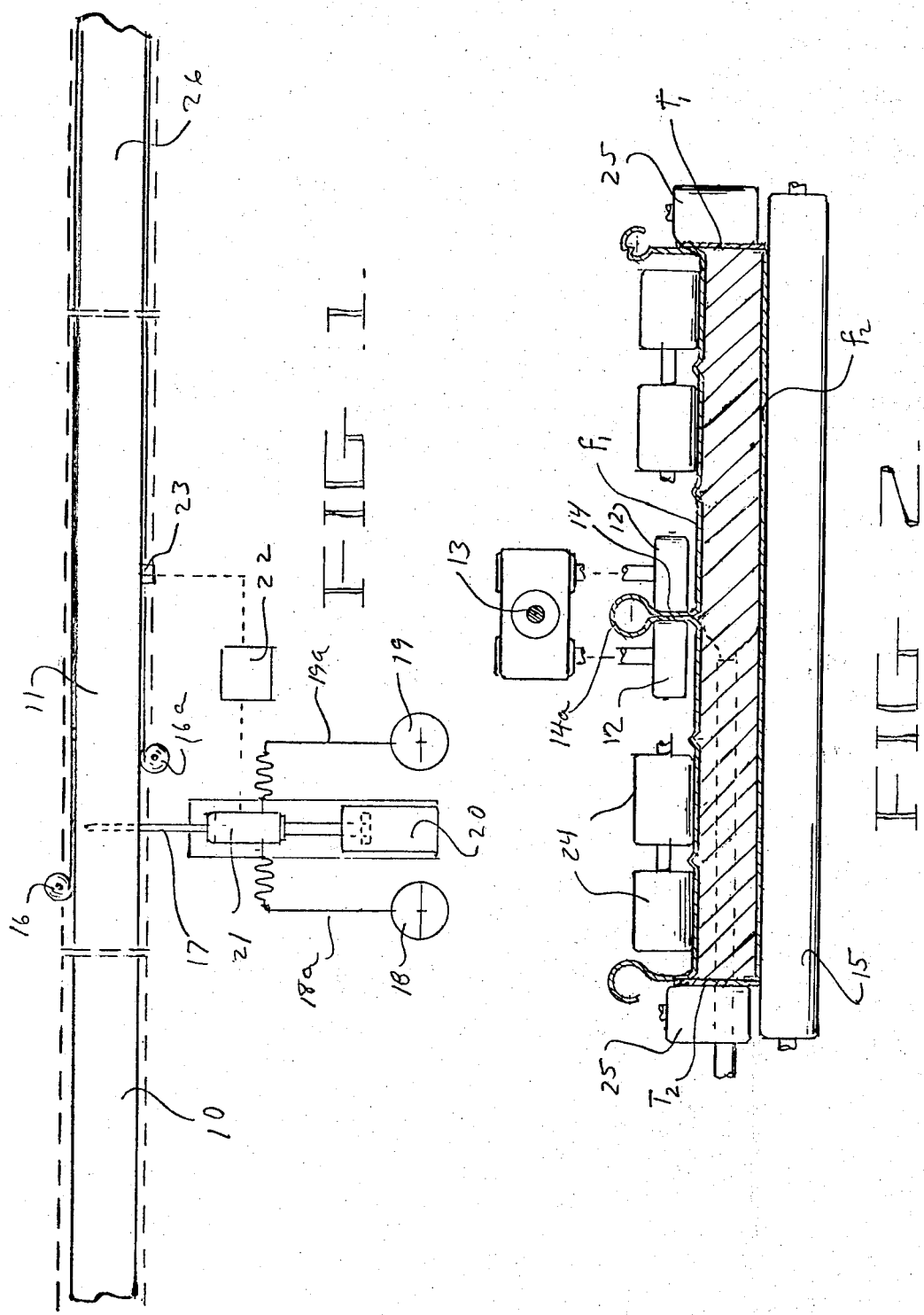

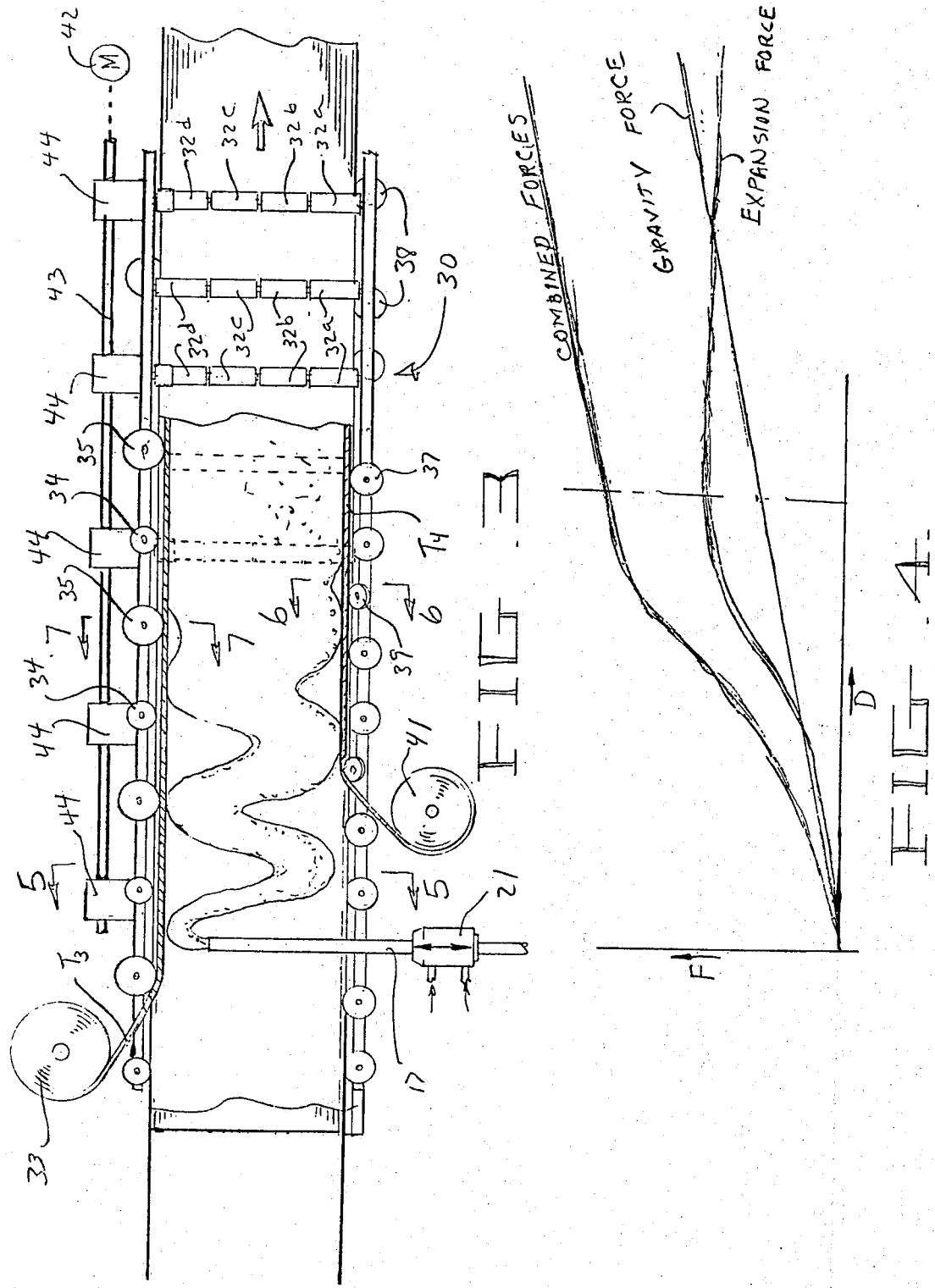

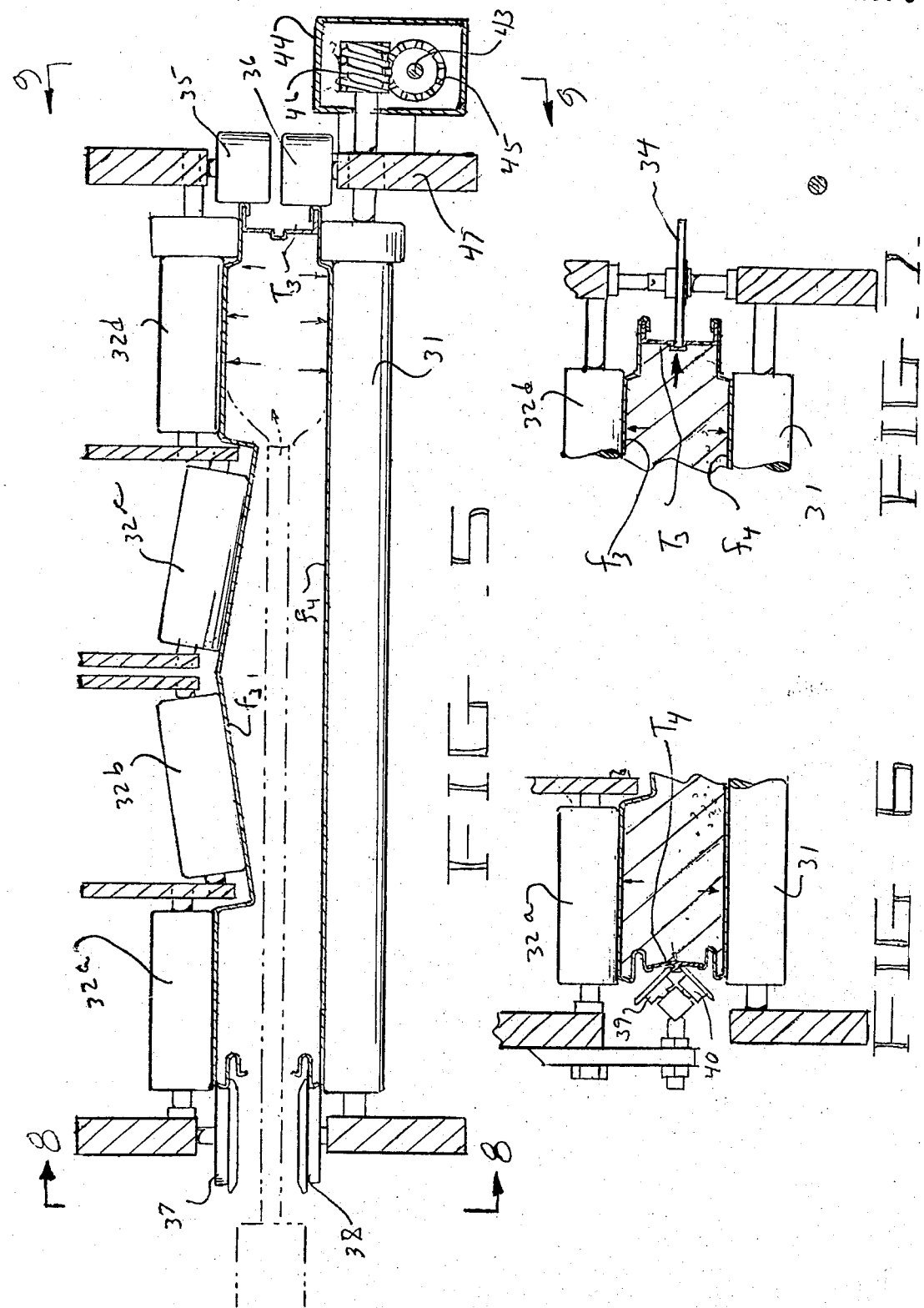

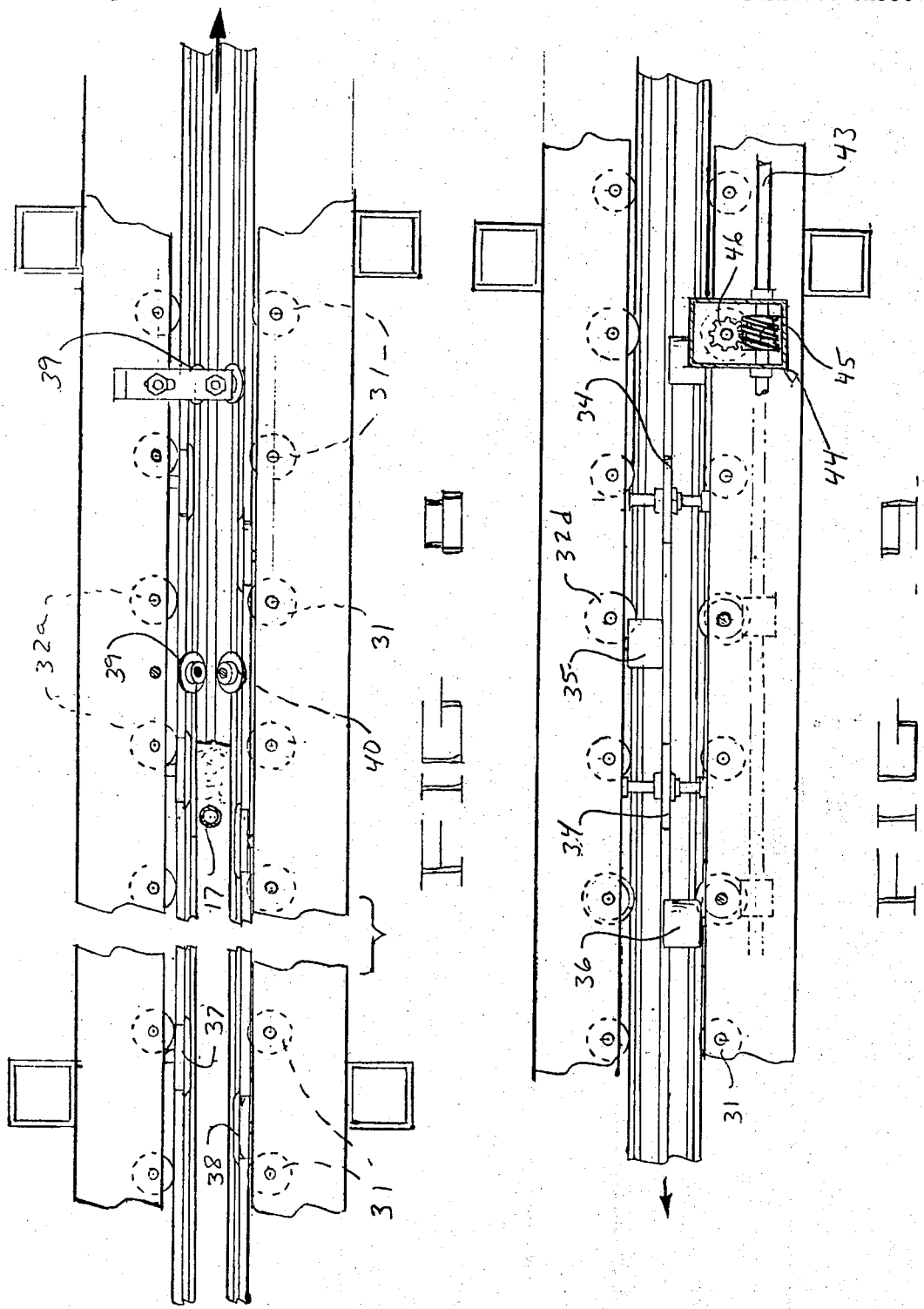

ABSTRACT OF THE DISCLOSURE

A continuous method for forming laminated panels, especially those having a foamed core of urethane, wherein a pair of panel facings are fed horizontally and in a relatively straight line while supported in spaced relation, one of said panels being driven and the other panel facing being connected to and correspondingly moved by the first, a setable mixture of foaming components being dispensed between said facings in a zig-zag pattern, and apparatus for carrying out the method to produce panels having a substantially uniform cell structure and minimum density gradients and being relatively free of voids.

This invention relates to continuous processes for manufacturing laminated panel structures and especially those panels having a core made with a setable mixture of foaming components to produce urethane foam.

In brief, the present invention essentially provides for the continuous dispensing or depositing of a setable mixture, preferably urethane foaming components, between two panel facings which are supported relative to each other as they pass through a foam dispensing station. The setable mixture is deposited between the facings in a zig-zag pattern by means of a reciprocating probe attached to a conventional mixing head.

The two facings are interconnected, preferably in advance of the foam dispensing station, and as one facing is moved, the other facing is pulled along while being maintained in relatively fixed, parallel relationship to the first. This condition is maintained both during the time the foam is deposited and while curing takes place to avoid any relative movement between the two facings as may rupture the cell structure, particularly at the critical interface of foam and facing. It has been found that such cell ruptures, which result in a weak adhesive bond, cause delamination if subjected to repeated thermal expansion and contraction as commonly experienced under normal exposure conditions. The use of particular methods and apparatus which allow the foaming ingredients to be dispensed in a zig-zag pattern between facings are also important features of this invention and contribute to the manufacture of panels having a substantially uniform cell structure, minimum density gradients and relative freedom from voids and/or air entrapments.

Accordingly, a principal object of the present invention is to provide a continuous process for forming a laminated panel having a central core formed with a foamed setable mixture, such as urethane producing mixtures, and which produce panels having substantially uniform cell structure, minimum density gradients and relative freedom from voids.

Another object is to provide methods and apparatus for forming a laminated panel having a central core of foamed components and which produce a strong adhesive bond between the foamed product and the panel facings.

A further object of this invention is to provide methods and apparatus of the kind described for: advancing a pair of panel facings while maintaining the facings in juxtaposed relation; inserting foaming ingredients between facings from one side; then sealing the one side with a flexible vinyl tape.

A further object is to provide methods and apparatus for continuously forming and moving a laminated panel and by means of which an exponentially greater driving force is developed as the foaming components expand.

A still further object of the invention is to provide methods and apparatus of the kind described including means for sensing the pressure upon the facings induced by the foaming ingredients and then controlling the amount of material dispensed between the facings per lineal unit of panel formed to maintain or control overall density.

Other objects of this invention will become apparent in view of the following detailed description.

In the drawings forming a part of this application and in which like parts are identified by like reference numerals.

FIG. 1 is a plan lay-out of a preferred method and apparatus for practicing this invention;

FIG. 2 is a vertical transverse section through one form of processing conveyor which might be used in connection with this invention;

FIG. 3 is a plan view of a second embodiment of this invention for making foamed panels;

FIG. 4 is a force diagram illustrating the beneficial effects derived with the apparatus of FIG. 3;

FIG. 5 is a vertical section taken on lines 5—5 of FIG. 3;

FIGS. 6 and 7 are partial vertical sections taken on lines 6—6 and 7—7, respectively, of FIG. 3; and FIGS. 8 and 9 are left and right side views and a partial section as viewed on lines 8—8 and 9—9 of FIG. 5.

Referring to FIG. 1 in particular, there is diagrammatically illustrated a process wherein a pair of panel facings $f_1$ and $f_2$ are fed in from the left on a load and feed conveyor 10. This conveyor may comprise a pair of conventional upper and lower roller conveyors which are substantially horizontal and extend one above the other in parallel spaced relationship. The pair of panels may be fed manually or by gravity along conveyor 10 onto a second conveyor means 11 which also supports the panels in parallel spaced relation. This conveyor means, however, provides means for moving the upper panel facing horizontally and linearly at a predetermined rate of speed and the second panel facing is moved by the first.

Referring to FIG. 2, one embodiment of conveyor means 11 comprises a pair of drive rollers 12 that are synchronously driven by an overhead drive shaft 13. Rollers 12 engage the opposite sides of a center rib 14 forming a part of upper panel facing $f_1$. A bead 14a on top of rib 14 is initially supported upon wheels 12 and thereby in turn supports the entire upper panel facing as it is first received onto conveyor means 11. The lower panel facing $f_2$ is supported by rollers 15 of a conventional roller conveyor.

Soon after upper and lower panel facings are received upon conveyor means 11, one longitudinal side of each facing is joined by a transparent side tape $T_1$. A conventional tape applicator 16 is provided for this purpose. The initial taping together of the two longitudinal edges of upper and lower panel facings not only serves to close the one side but also serves to interconnect or join the facings so that the lower facing $f_2$ will be pulled along by upper facing $f_1$. Thus, both facings will move together and at the same rate of speed during the foamfilling process. This, it has been found, is an important and necessary step. If otherwise, and should the panel facings move at different rates of speed, a weak adhesive bond results.

The foam filling process commences soon after a suitable length of tape has been applied by applicator 16 as will ensure positive and corresponding movement of the facings.

A second tape applicator 16a is mounted directly in back of or downstream relative to a dispensing probe 17. Accordingly, as soon as the setable foaming mixture has been inserted or dispensed between the upper and lower panel facings, the longitudinal edges nearest to the probe are sealed together by a second transparent tape $T_2$. Thereafter, the foaming ingredients will expand both vertically and laterally until all space is filled. This condition is readily determined by mere inspection of the side edges of the panel which are sealed by the transparent tape.

The foam dispensing and injection operation is accomplished by reciprocating probe 17 transversely relative to the direction of panel movement. In the apparatus shown, foam forming ingredients are stored in tanks 18 and 19 which are fed to a mixing head 21 that connects with probe 17. An hydraulic cylinder 20 is provided for reciprocating the mixing head 21 and probe 17; and limit switches (not shown) are disposed in the path of a control arm to reverse the direction of hydraulic cylinder operation, thereby providing continuous and cyclical reciprocation. Flexible connections 18a and 19a connect tanks 18 and 19, respectively, with mixing head 21, thereby allowing the mixing head and probe 17 to be reciprocated while the supply tanks remain relatively fixed.

The rate at which setable foaming mixture is dispensed from mixing head 21 is regulated from a control panel 22, and in a preferred embodiment, the setting of the control panel is determined by the foam pressure against one of the transparent tapes. A pressure sensing device 23 positioned to engage the panel after the foaming mixture will have expanded may also be used to adjust the setting on the control panel.

Referring to FIG. 2, conveyor means 11 also comprises a series of upper pressure rollers 24 and side pressure rollers 25. Upper rollers 24 limit the vertical expansion of the foaming ingredients and assure good contact at the interface between the setable mixture and the panel facings. Rollers 25 similarly contain the foaming mixture along the sides and provide added strength and backing for the continuous transparent tapes. The disposition and use of rollers 24 and 25 should allow processing of the panels along the conveyor 11 until such time that the mixture of foaming ingredients has taken a positive set. The completed panel structure may thereafter be continuously fed into a take-off conveyor 26 which is of conventional design. If desired, a flying saw (not shown) or other cut-off means may be utilized and incorporated into the system for cutting the panels to selected lengths.

Referring to FIGS. 3-9, there is shown a second embodiment of this invention in methods and apparatus for moving a laminated panel structure as it is formed between first and second sets of rollers. More particularly, conveyor 30 (which corresponds to the conveyor 11 of the first embodiment) comprises a first set of supportive rollers 31 arranged horizontally in substantially straight line and a second set of upper limiting rollers 32a, 32b, 32c and 32d. Each upper roller is rotatably mounted at predetermined distances above rollers 31, the axis of each upper roller being oriented so that the bottom surfaces thereof contact the upper contoured surface of the facing $f_3$ when said facing is raised under the pressure of the foaming setable mixture introduced between facings $f_3$ and $f_4$.

A plastic strip of vinyl tape $T_3$, which may be inserted between the facings in advance of conveyor 30 or supplied on a tape reel 33, as shown, is engaged with the longitudinal edges of facings $f_3$ and $f_4$ at a station ahead of a dispensing probe 17. The interconnection of facings provided by tape $T_3$ may be used as the interconnection for moving or pulling one facing (in this instance facing $f_3$) as the other facing $f_4$ is advanced by supportive rollers 31. However, it is contemplated that the lead ends of facings $f_3$ and $f_4$ may also be connected by a common spacer bar which serves as the front end closure of the panel structure. In any event, and after the first few feet of panel have been formed and the foamed setable mixture has set, facing $f_3$ will be pulled along by tape $T_3$ as well as the fully cured mixture of foaming components.

Referring to FIG. 7, a plurality of guide wheels 34 positioned intermediate rollers 31 and 32d engage a groove formed in the tape $T_3$. It will be seen that wheels 34 provide backing to prevent a collapse and unwanted deformation of tape $T_3$ while the foaming ingredients expand into pressure contact therewith.

As facings $f_3$ and $f_4$ are introduced between lower supportive rollers 31 and upper confining rollers 32a-32d, they are fed into parallel alignment and maintained in alignment by rollers 35 and 36 and a pair of spacing wheels 37 and 38. Referring to FIG. 5, rollers 35 and 36 laterally contact the edges of facings $f_3$ and $f_4$ respectively, while spacing wheels 37 and 38 also maintain the opposite longitudinal edges of facings $f_3$ and $f_4$ in vertical spaced relationship. This allows probe 17 to be inserted between the facings for dispensing the setable mixture in a zig-zag pattern as shown in FIG. 3. Thereafter, a second tape $T_4$ is introduced between the left-hand edges of facings $f_3$ and $f_4$, as viewed in FIGS. 5 and 6, by means of a pair of guide wheels 39 and 40. Tape $T_4$ may be supplied from a tape roll 41.

As indicated above, panel facings $f_3$ and $f_4$ are moved directly and indirectly by the supportive rollers 31 which are synchronously driven by a motor 42 from a drive shaft 43 and through one of a plurality of gear boxes 44. Each gear box essentially comprises and contains a worm 45 mounted to drive shaft 43 and engaged by a gear 46 coaxially mounted to a roller 31 through a bearing mount 47.

The above described conveyor apparatus is of particular value since the moving force imparted to the laminated panel structure being processed is attributable in part to the expansion forces of the foaming setable mixture rather than gravity forces alone. This may be an important factor since small interruptions of movement, delays or even a change in rate of movement may disrupt the lamination process and result in weak bonding.

The combined presence of both expansion forces and gravity forces is best illustrated in FIG. 4 from which it will be apparent that these forces complement one another and produce a combined force effect, increasing the frictional drive force which may be imparted to the lower panel facing $f_4$ by each roller 31. Thus, a uniform rate of movement is assured since minor slippage on one or several rollers 31 will have little overall effect on the total drive force available.

Although a preferred form of the invention is illustrated and described, various modifications and changes may be resorted to without departing from the spirit of the invention or the scope of the appended claims, and each of such modifications and changes is contemplated.

What is claimed is:

1. Apparatus of the kind described for the continuous manufacture of foamed laminated panel structures having a pair of panel facings, comprising: roller means for horizontally supporting a pair of panel facings in predetermined vertically spaced relationship; means for horizontally moving the panel facings in a relatively straight line while maintaining the facings in vertically spaced relationship including a plurality of drive rollers engageable with one facing; and means interconnecting the pair of facings, whereby movement of said one facing imparts a corresponding and simultaneous movement to the other facing; and means including a reciprocating dispensing probe for inserting a settable mixture of foaming ingredients laterally between a pair of facings from one side thereof, the rate at which the settable mixture is dispensed, the rate of reciprocation of said probe and the rate of movement of the panel facings being regulated, adjusted or controlled to ensure a complete filling of the space between panel facings.

2. The apparatus of claim 1, said means interconnecting the lateral edges of said pair of facings comprising a transparent tape applied between the parallel longitudinal edges on one side of said pair of facings in advance of said dispensing probe.

3. The apparatus of claim 1, and further comprising means for applying said transparent tape as said pair of facings are moved.

4. The apparatus of claim 1, and further comprising means for applying transparent tape between longitudinal edges on the opposite side of said panel facings after dispensing the settable mixture between facings.

5. The apparatus of claim 4, and further comprising means for maintaining the transparent tapes in position intermediate the longitudinal edges of said panel facings while said facings are moved and until the settable mixture has substantially set.

6. The apparatus of claim 4, and further comprising a pressure sensing device for measuring the pressure applied to one of said tapes, and means responsive to said pressure sensing device for varying the amount of settable mixture dispensed between facings per unit length of panel formed.

7. The apparatus of claim 1, said supporting means comprising first and second sets of rollers, each set arranged substantially horizontal and parallel to the other set at a fixed predetermined distance.

8. The apparatus of claim 7, said first set of rollers being supportive of said panel structures as they are formed, the rollers of said first set being synchronously driven from a common power source.

9. The apparatus of claim 8, and further comprising a drive shaft extending longitudinally of said first set of rollers, and gearing means interconnecting said first set of rollers with said drive shaft.

10. Apparatus of the kind described for the continuous manufacture of foamed laminated panel structures having a pair of panel facings, comprising: roller means for horizontally supporting a pair of panel facings in predetermined vertically spaced relationship; means for moving the panel facings in a relatively straight line while maintaining the facings in vertically spaced relationship including a first set of supportive drive rollers engageable with the lowermost facing; means for synchronously rotating said supportive drive rollers; a second set of rollers arranged substantially parallel to and at a fixed predetermined distance above said first set of rollers; and means including a reciproacting dispensing probe for inserting a settable mixture of foaming ingredients between a pair of facings supported between said first and second set of rollers; the rate at which the settable mixture is dispensed, the rate of reciprocation of said probe and the rate of movement of said panel facings being regulated, adjusted or controlled to ensure complete pressure filling of the space between panel facings.

11. The apparatus of claim 10, said means for synchronously rotating said supportive drive rollers comprising a drive shaft extending longitudinally of said first set of rollers, and gearing means interconnecting said first set of rollers with said drive shaft.

12. The apparatus of claim 10, and further comprising means for inserting a pair of tapes along and between the longitudinal edges of a pair of supported facings, and means for retaining the tapes in position while the settable mixture foams into pressure contact therewith.

13. The apparatus of claim 12, said means for inserting one of said tapes comprising a plurality of roller guides positioned intermediate said first and second sets of rollers downline of said dispensing probe, each roller guide comprising a pair of wheels arranged in converging relation and engageable with the rib of a tape for positioning and supporting said tape while the settable mixture foams into pressure contact therewith.

14. Apparatus of the kind described for the continuous manufacture of foamed laminated panel structures having a pair of panel facings, comprising: roller means including a pair of upper and lower horizontal roller conveyors for supporting and maintaining a pair of panel facings in predetermined vertically spaced and substantially parallel relationship; means for moving the panel facings along and between said upper and lower roller conveyors; and a horizontally reciprocating dispensing probe for inserting a settable mixture of foaming ingredients between the pair of facings from one side of said roller conveyors, the rate at which the settable mixture is dispensed, the rate of reciprocation of said probe and the rate of movement of said panel facings being regulated, adjusted or controlled to insure complete filling movement to the pair of facings.

15. The apparatus of claim 14, and further comprising first and second means for applying a side seal along the longitudinal edges on both sides of said panel facings, respectively, to retain the settable mixture therebetween, the side seals imparting a corresponding and simultaneous movement to the pair of facings.

16. The apparatus of claim 14, and further comprising means for inserting side retainer strips between longitudinal adjacent edges on both sides of said panel facings, at least one side retainer strip being inserted downstream relative to the horizontally reciprocating dispensing probe, each retainer strip at least partially supporting the uppermost panel facing from the lower panel facing while the mixture of foaming ingredients expands to pressure-fill the space between panel facings and side retainer strips.

References Cited
UNITED STATES PATENTS

| | | | |
|---|---|---|---|
| 2,841,205 | 7/1958 | Bird | 156—79 |
| 3,233,576 | 2/1966 | Voelker | 156—79 |
| 3,240,655 | 3/1966 | Voelker | 156—79 |
| 3,240,846 | 3/1966 | Voelker | 156—79 |
| 3,560,285 | 2/1971 | Schroter et al. | 156—79 |

MARION M. McCAMISH, Primary Examiner

U.S. Cl. X.R.

156—79, 360, 361, 500

UNITED STATES PATENT OFFICE
CERTIFICATE OF CORRECTION

Patent No. 3,834,967     Dated September 10, 1974

Inventor(s) William E. Lowery et al.

It is certified that error appears in the above-identified patent and that said Letters Patent are hereby corrected as shown below:

Column 3, line 20, the word "providing" should read -- producing --.

Column 3, line 45, the word "into" should read -- onto --.

Column 3, line 55, the word "a" has been omitted between the words "in" and "substantially".

Column 6, line 29, the words "movement to the pair of facings" should read -- of the space between panel facings --.

Signed and sealed this 19th day of November 1974.

(SEAL)
Attest:

McCOY M. GIBSON JR.
Attesting Officer

C. MARSHALL DANN
Commissioner of Patents